(12) United States Patent
Shimoji et al.

(10) Patent No.: US 7,341,381 B2
(45) Date of Patent: Mar. 11, 2008

(54) OPTICAL CONNECTOR

(75) Inventors: Naoko Shimoji, Tokyo (JP); Masato Shiino, Tokyo (JP); Masanobu Toyonaga, Tsukuba (JP); Kuniaki Terakawa, Tsukuba (JP); Hiroyuki Tanase, Tsukuba (JP); Tatsuya Nakajima, Tsukuba (JP); Masashi Awamori, Tsukuba (JP); Kazuhiro Takizawa, Chiba (JP); Daigo Saitoh, Chiba (JP); Kenichiro Ohtsuka, Kanagawa (JP); Daizo Nishioka, Kanagawa (JP); Masahiro Hamada, Kanagawa (JP)

(73) Assignees: The Furukawa Electric Co., Ltd, Tokyo (JP); Nippon Telegraph & Telephone Corporation, Tokyo (JP); Fujikura Ltd., Tokyo (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/553,709

(22) Filed: Oct. 27, 2006

(65) Prior Publication Data

US 2007/0098329 A1    May 3, 2007

(30) Foreign Application Priority Data

Oct. 27, 2005    (JP)    ............................. 2005-312342

(51) Int. Cl.
*G02B 6/36* (2006.01)

(52) U.S. Cl. ............................. 385/76; 385/60; 385/77; 385/78

(58) Field of Classification Search .................. 385/60, 385/76–78
See application file for complete search history.

(56) References Cited

U.S. PATENT DOCUMENTS 4,611,887 A * 9/1986 Glover et al. .................. 385/71
6,290,527 B1    9/2001 Takaya, et al.

FOREIGN PATENT DOCUMENTS

JP    2000-147323    5/2000

* cited by examiner

*Primary Examiner*—Frank G. Font
*Assistant Examiner*—Michael P. Mooney
(74) *Attorney, Agent, or Firm*—Oblon, Spivak, McClelland, Maier & Neustadt, P.C.

(57) ABSTRACT

A cantilever type latch having the fixed end on the side of exposing the terminal end surface of the optical fiber is provided on the side of the plug housing. Near the center of the upper surface of the latch, an engaging projection which is to be engaged in the engaging hole formed in the adapter or the receptacle is formed. The engaging projection has the slope which decreases the height toward the fixed end side of the latch, in which the gradient of the slope is nearly equal to or greater than the rotation angle required for the elastic deformation of the latch with the fixed end functioned as the fulcrum. Thereby easy disconnecting of the latch is implemented.

9 Claims, 7 Drawing Sheets

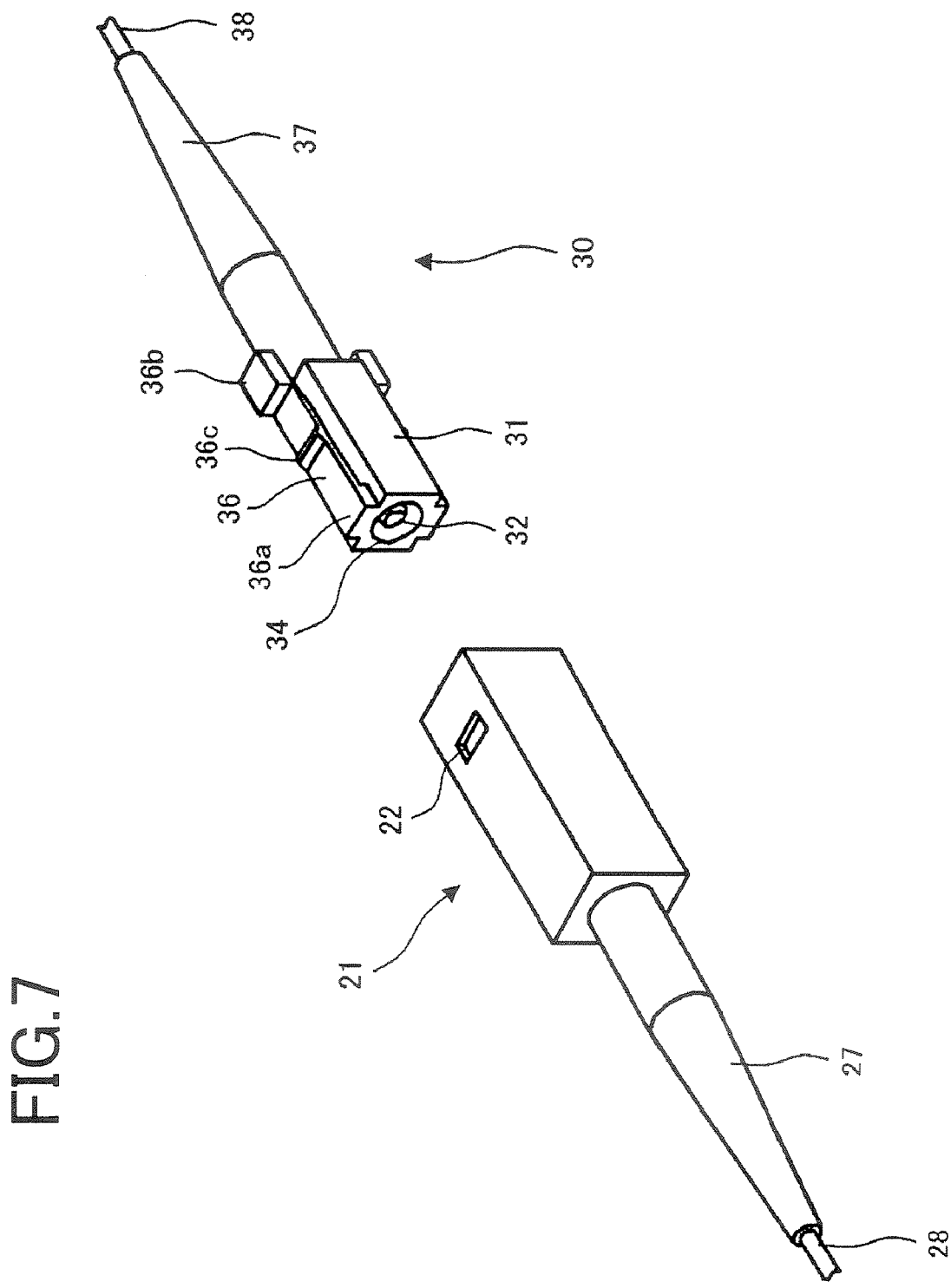

OPTICAL CONNECTOR

BACKGROUND OF THE INVENTION

1. Field of the Invention

The invention relates to an optical connector which optically connects an optical fiber.

2. Description of the Related Art

In general, there are optical connectors having a joint system which is a combination of a slider and a latch such as an SC connector (JIS C 5973) and an MPO connector (JIS C 5982), and the one having the modular jack method as disclosed in Japanese Published Unexamined Patent Application No. 2000-147323. Both systems of optical connectors are mainly used for connecting points of an optical fiber which needs to undergo frequent connecting and disconnecting in equipments or between equipments at indoor.

On the other hand, for connection at outdoor, the mechanical splice or fusion splice is mainly used, but optical connectors as described above are rarely used.

As the rapid spread of Internet usage in homes in recent years, urgency of an optical connector that allows easier connecting operation at a relay point of an optical fiber extended from a central office to a customer site heightens. One of disadvantageous factor of using an optical connector is the size of its structure.

Typically, an optical connector is comprised of a pair of optical connector plugs within which is arranged an optical fiber, and an adapter for connecting these. The function for connecting an optical connector plug to an adapter connector plug includes some latch springs of an adapter in the SC connector and a cantilever style latch of the optical connector plug in the modular jack method. In the case of both optical connectors, latch members have enough thickness to hold the connection, and an appropriate clearance, such as a latch which does not cause interference, is provided between the latch and the slider (or the adapter in the case of modular jack system) in order to remove the optical connector plug smoothly from the adapter.

However, in order to reduce the size of the optical connector, structural extra clearance and any unnecessary thickness of the latch should be avoided. On the other hand, reducing the thickness of the latch has some cause for concerns. In particular, it might cause decrease of the engagement force. Otherwise, when releasing the latch, an engaging projection formed on the latch might not be detached from the adapter because of excessive bending of the latch arm.

BRIEF SUMMARY OF THE INVENTION

The present invention provides an optical connector with latch structure which minimizes the thickness of the latch and clearances in each part and implements smooth connecting and disconnecting operations in order to decrease the size and weight, for the modular jack type optical connector that enables easier connecting and disconnecting.

The latch structure at the optical connector plug in the optical connector of the present invention is characterized in that the gradient, sufficiently larger than the rotation angle caused by elastic deformation required to release the engaging projection, is made while setting the fixed end of the latch as a fulcrum, in an area where is closer to the terminal end (press operation side) than the engaging projection and below the latch while allowing that the latch arm slightly bends.

More specifically, the optical connector comprises an optical fiber, and a ferrule that holds the optical fiber so as to expose its terminal end surface, and an optical connector plug having a plug housing for accommodating the ferrule and the optical fiber, and an adapter or a receptacle having an opening with which the optical connector plug is connectable/disconnectable.

On at least one side of the plug housing, a cantilever type latch having an fixed end at the opening which exposes a terminal end of the optical fiber is provided, and the latch can have elastic deformation by pressing the terminal end at the opposite side of the fixed end to a direction which is perpendicular to an optic axis of the optical fiber.

Each latch is formed such that its upper surface is substantially parallel with the side of the plug housing, and near the center of the each latch upper surface, an engaging projection is projected so as to be engaged in an engaging hole provided in the adapter or the receptacle.

This engaging projection has a slope which is inclining to the fixed end side of the latch, and, between the lower surface of the latch which is the back side of the engaging projection and the side of the plug housing, a clearance which is nearly equal to or greater than the height of the engaging projection is formed, and at the lower surface of the latch, a slope of which the clearance from the side of the plug housing increases from the vicinity of the engaging projection to the terminal end is formed, and the gradient of this slope is made so as to be nearly equal to or greater than the rotation angle required for the elastic deformation of the latch with setting the fixed end as the fulcrum.

In addition, in the fixed end side area of the latch, a gradient in parallel with the side of the optical connector plug or that is very slight is provided in order to prevent that only the backward of the latch bends.

Furthermore, a pair of latches is provided at the opposite side of the optical connector plug to prevent accidental disconnection.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 7 is a perspective diagram of an embodiment in FIG. 6.

DETAILED DESCRIPTION OF THE INVENTION

First Embodiment

Figure 1:
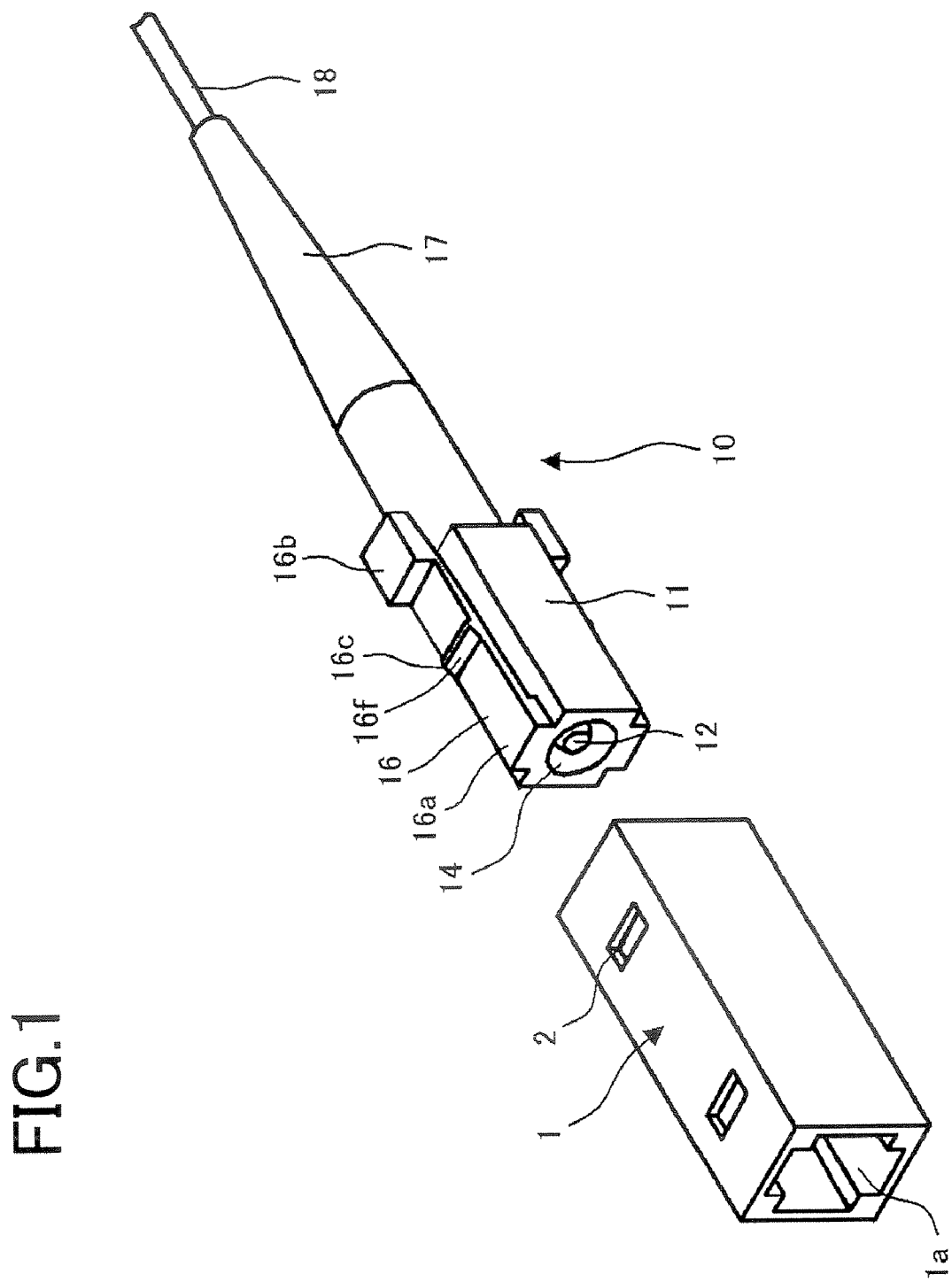
FIG. 1 is a perspective diagram of an embodiment of the present invention.

FIG. 1 is an external view of an optical connector, which is comprised of an optical connector plug 10 and an adapter 1 for connecting a pair of optical connector plugs in an embodiment of the present invention.

Figure 2:
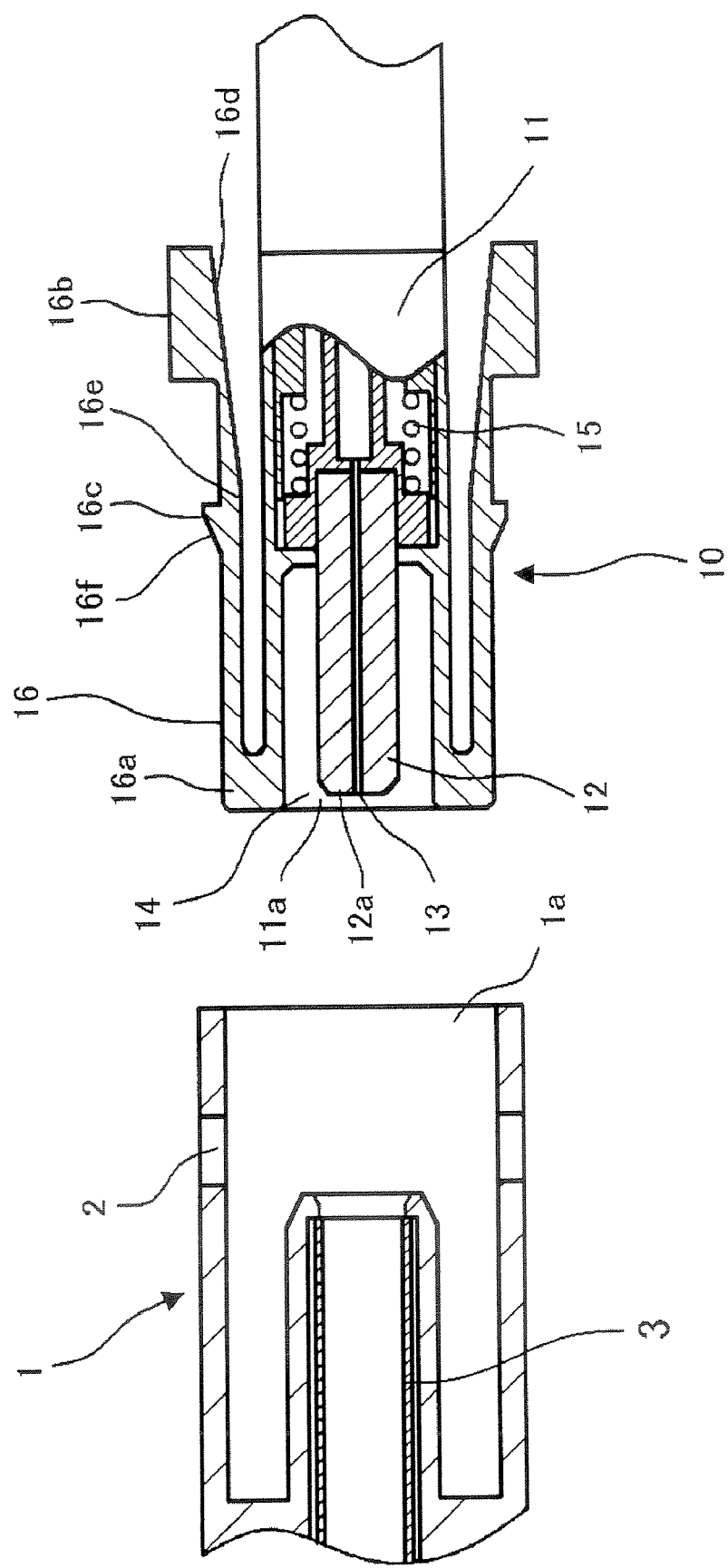
FIG. 2 is a cross sectional view of the relevant part of the embodiment in FIG. 1.

FIG. 2 shows a cross section of an engaging portion between the adapter 1 and the optical connector plug 10 shown in FIG. 1 described above. In FIG. 2, an optical fiber 13 to be connected is installed and held within a ferrule 12 such that its terminal end surface is exposed from a ferrule end face 12a, and the ferrule 12 is accommodated in a plug housing 11. In the ferrule 12 shown in FIG. 2, an optical fiber with single core is installed, but a plurality of optical fibers may be installed in one ferrule 12. For the material of the ferrule 12, ceramics such as zirconia, thermal plasticity or thermoset plastics, glass, or the like is often applied, or combinations of these materials may be used. Also, the optical fiber 13 is fixed with an adhesive agent or the like to the inside of a fine hole in the ferrule 12.

The optical fiber 13 installed in the ferrule 12 is accommodated in the plug housing 11 such that the ferrule end face 12a including the terminal end surface of the optical fiber is oriented to the opening 11a. At the back side of the ferrule 12, a spring 15 for applying a pressure to the ferrule end face 12a is installed.

The plug housing 11 includes a cantilever type latch 16 on the side surface thereof and has, as illustrated, a substantially uniform cross section across a main body portion thereof. In FIG. 2, a pair of latches 16 is provided on the opposing side surfaces.

The latch 16 has a fixed end 16a at an opening 11a of the plug housing 11, and a pressing element 16b at a terminal end which is opposite side of the fixed end 16a. By pressing the pressing element 16b in a direction which is perpendicular to the optic axis of the optical fiber, the latch 16 is elastically deformed with the fixed end 16a functioning as a fulcrum.

For the plug housing 11 having this latch 16, engineering plastics such as PPS(polyphenylene sulfide), PBT(polybutylene terephthalate), PC(polycarbonate), etc., or super engineering plastics such as PEI (polyether imide), PES (polyether sulphone), etc. are applied. Near the center of the upper surface of the latch 16, an engaging projection 16c is formed. The engaging projection 16c has a slope 16f which is declining toward a fixed end 16a of the latch 16.

Figure 3A:
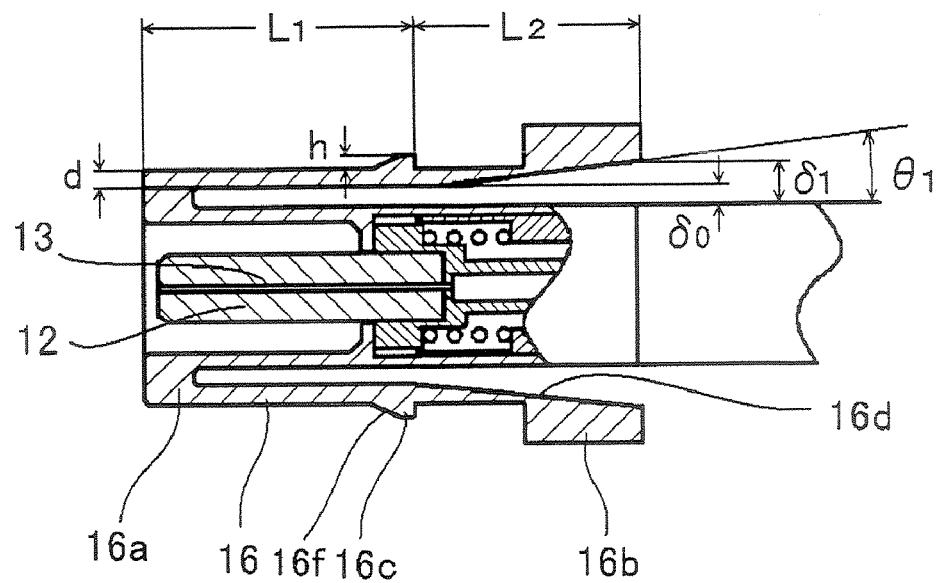
FIGS. 3 A, 3B are cross sectional views each explaining an operation in the embodiment in FIG. 1.

FIG. 3A is a detailed diagram of the latch structure. Between the lower surface of the latch which is the back side of the engaging projection 16c and the side of the plug housing, a clearance δ0 which is nearly equal to or greater than a height h of the engaging projection is included. In other word, when the latch 16 is elastically deformed and a slope starting point 16e of the latch 16 is contacted with the side of the plug housing 11, the slope 16d at the terminal end of the latch 16 contacts the side surface of the plug housing 11 or have a clearance to the side surface of the plug housing.

The lower surface of the latch 16 has the slope 16d where a clearance from the side of the plug housing increases from the vicinity of the engaging projection 16c to the pressing element 16b, and a gradient θ1 of the slope 16d is formed so as to be nearly equal to or greater than a rotation angle θ0 which is required for elastic deformation, with the fixed end 16a operated as the fulcrum.

Figure 4A:
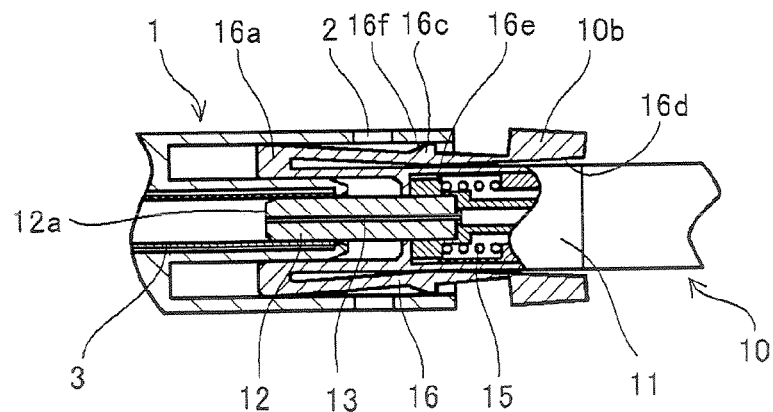
FIGS. 4 A-4C are diagrams each explaining an operation in the embodiment in FIG. 1 that is different from FIG. 3.
Figure 4B:
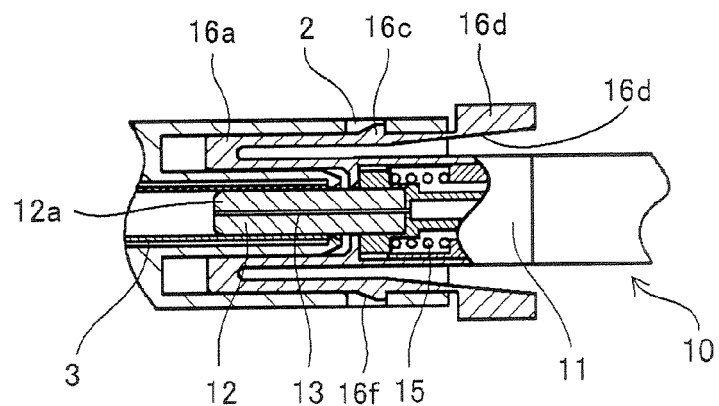

The adapter 1 for connecting the pair of optical connector plugs 10 has an engaging hole 2 capable of connecting with the engaging projection 16c of the optical connector plug 10. From the opening 1a of the adapter 1, the optical connector plug 10 is inserted, and when the engaging projection 16c contacts the inner wall forming the opening 1a of the adapter, elastic deformation is started such that the latch 16 rotates with setting the fixed end 16a as the fulcrum as shown in FIG. 4A. Additionally, the optical connector plug 10 is inserted to the adapter 1, and when the engaging projection 16c reaches the engaging hole 2, the latch 16 is released from the elastic deformation back to the initial non-deformed state, and then the engaging projection 16c is engaged in the engaging hole 2 as shown in FIG. 4B.

Figure 4C:
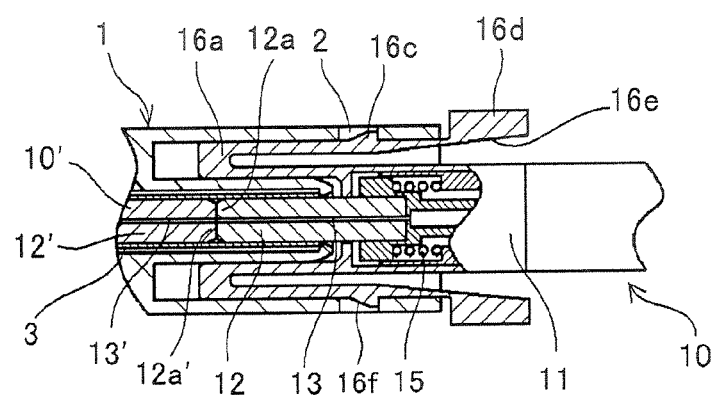

After engaging one optical connector plug 10 to the adapter 1, another optical connector plug, 10' is inserted to the adapter 1 in the same manner and when an engaging projection (not illustrated) is engaged in the engaging hole of the adapter 1, ferrule end faces 12a, 12a of each optical connector plug 10, 10' contact and a pressure is applied to them by a spring 15 installed in the plug housing 11 as shown in FIG. 4C. The pressure in this regard is presumed to be 9.8N±2N, if it is nearly equal to the case of general optical connector regulated by Japanese Industrial Standards.

Here, in FIG. 2, a cylinder shape ferrule 12 holding a single core optical fiber 13 in it is illustrated, and the outer dimension and shape, relative position of fiber hole with respect to the outer shape, and dimension of the fiber hole are highly accurately controlled in this kind of the ferrule, so that by connecting through a elastically deformable split sleeve 3, opposing optical fibers are aligned to be connected with high accuracy.

Figure 3B:
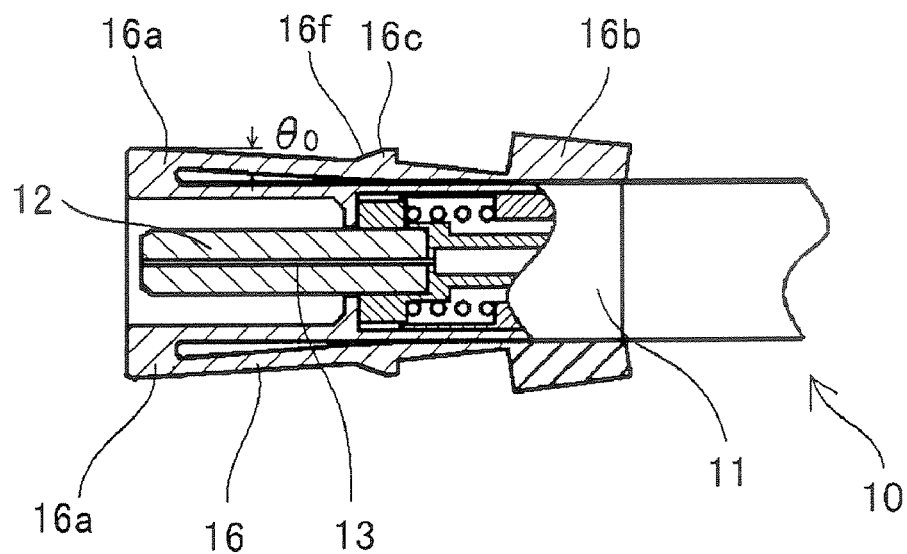

Next, when the optical connector plug 10 is disconnected from the adapter 1, as shown in FIG. 3B, the pressing element 16b is pressed to the direction which is perpendicular to the optic axis to rotates the latch 16 due to the elastic deformation with setting the fixed end 16a as fulcrum. Then, the latch 16 is deformed until the lower surface of the latch 16 comes close to the side of the plug housing 11, thus the engagement between the engaging projection 16c and the engaging hole 2 is released and the optical connector plug 10 can be disconnected. The disconnecting operation can easily be carried out by pressing the both pressing elements 14b with fingers.

When the optical connector plug is disconnected, a pressure force works which is generated at the contacting surface between the engaging projection 16c and the engaging hole 2 by the spring 15 installed in the optical connector plug, so that an area ranging from the fixed end 16a to the engaging projection 16c of the latch 16 is hard to be deformed when pressing the pressing element 16b, comparing to an area ranging from the engaging projection 16c to the pressing element 16b. Therefore, it is preferred that the amount of deformation of the pressing element 16b, that is, the clearance δ1 at the end of the pressing element between the pressing element 16b and the side of the plug housing is larger than the clearance δ0 at the lower surface of the engaging projection 16c. Accordingly, the rotation of the latch 16 can be facilitated at the region in the fixed end 16a rather than the region in the engaging projection 16c, by forming the slope 16d at the lower surface of the latch which is ranged from the lower surface corresponding to the engaging projection 16c to the end of the pressing element 16b.

Regarding the gradient θ1 of the slope 16d, the proper value varies on the thickness of the latch d, material, the length of the latch, etc. For example, the larger cross sectional area (especially thickness d) the latch has, the smaller bending of the latch between the fixed end 16a and the pressing element 16b occurs, so that the engaging projection is released by small rotational elastic deformation.

However, to downsize the optical connector structure, it is advantageous to have thinner latch thickness d. The lowest value of the latch 16 thickness capable of being formed, varies on the applied material, is generally around 0.3-0.5 mm.

In the case that the latch thickness d is as thin as the level above mentioned, even if the latch thickness is uniform over the entire length, the latch tends to bend easily while pressing the pressing element. In this regard, if the latch clearance δ0 is sufficiently greater than the height h of the engaging projection, rather than the amount of deformation in the latch, the engagement can be released although the latch bending occurred. But for the reason that a smaller clearance δ0 is advantageous to downsize the optical connector structure, it is preferred to make the clearance δ0 to be nearly equal to or greater than the engaging projection height h, and to restrict the size of both of height h and clearance δ0. For example, when the engaging projection height h is 0.3-0.5 mm, the clearance δ0 can be controlled to be as around 0.6 mm.

Furthermore, before the pressing element 16b completely contacts the side of the plug housing 11, the engagement of the engaging projection 16c must be released. When the slope starting point 16e of the slope 16d is located almost directly below the engaging projection 16c, the rotation angle δ0 of the latch 16 becomes tan θ0≈h/L1, wherein the distance from the fixed end 16a to the engaging projection 16c is L1. Thus, the gradient θ1 of the slope 16d from the engaging projection 16c to the end of the pressing element 16b is preferably as follows:

$$\tan \theta_1 (\delta_1 - \delta_0)/L_2 \gg h/L_1$$

(where h≦δ0)

In this regard, the slope starting point 16e of the slope 16d can be an inflexion point of the elastic deformation subjected by the latch 16. When the slope starting point 16e is located almost directly below the engaging projection 16c, as the pressure generated by the spring 15 that subjects to the engaging projection increases, it is getting difficult to deform the fixed end side from the engaging projection, at the same time easy to elastically deform the latch with setting the engaging projection as the fulcrum.

Figure 5A:
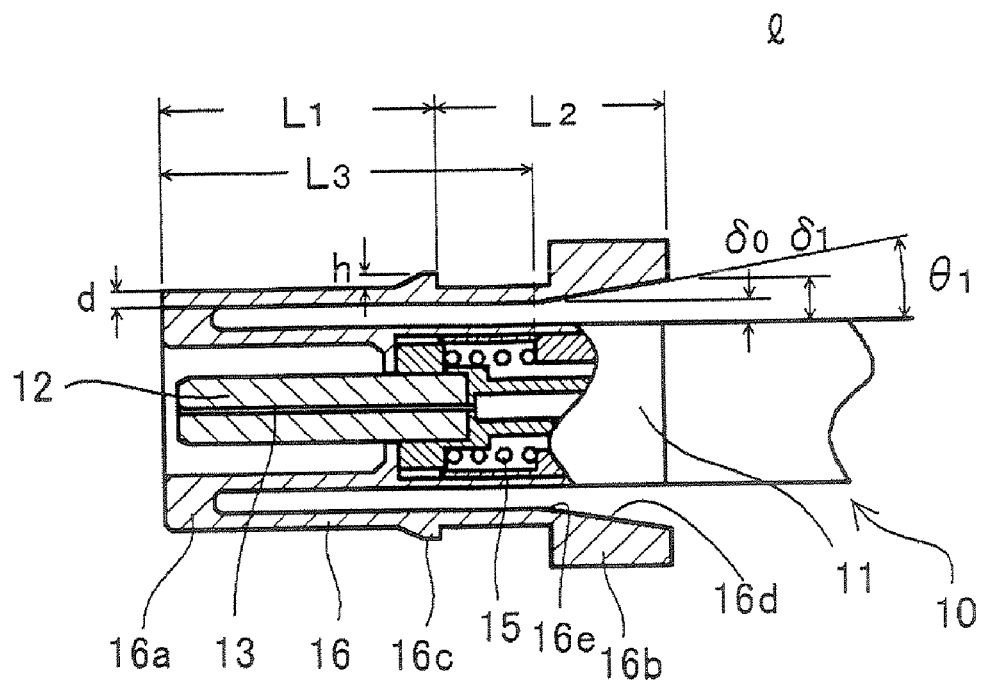
FIGS. 5 A, 5B are cross sectional views of other embodiments of the present invention.
Figure 5B:
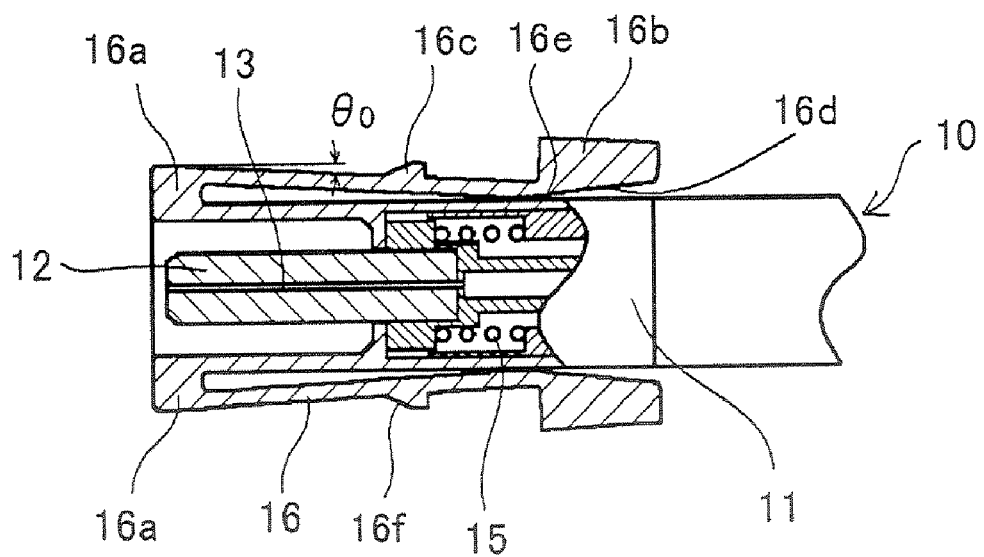

On the other hand, in FIG. 5 A, B, when the slope starting point 16e of the slope 16d is located at the back side of the engaging projection 16d (which is close to the fixed end 16a), the rotation angle θ0 required to release the engaging projection of the latch 16 is tan θ0≈h/L1, similarly, but the bending moment within the area from the engaging projection 16c to the pressing element 16b increases, the local bending radius increases according to that, which is capable of controlling the engagement of the latch back side.

For example, when the engaging projection 16c height h is 0.4 mm, and the clearance δ0 is 0.6 mm, the distance L1 from the fixed end 16a to the engaging projection 16c, and the distance L3 to the slope starting point 16e of the slope 16d is 10 mm and 13 mm, respectively, the rotation angle θ0 required to release the engagement is two-three degrees, and the amount of variation in L3 without expecting the elastic deformation is about 0.5 mm, which is sufficiently smaller than the clearance δ0, so that the engaging projection is released before the slope starting point 16e comes to fully contact with the side of the plug housing.

At this time, as long as the slope is formed at the back side of the latch, the elastic deformation surely occurs with setting the slope starting point as the fulcrum of the latch. This elastic deformation in the latch 16 is the combination of the flexural center and two kinds of bending deformation with different cross sectional areas. Although theorizing of the phenomenon is very complicated, experiments showed that the engaging projection was released when the gradient θ1 at the back side of the latch is set to be around four to ten degrees, whereas the rotation angle θ0 of the front side of the latch is two to three degrees.

The lower surface of the latch 16 close to the fixed end 16a is illustrated nearly in parallel with the side of the plug housing 11, but the resistance against the pressure generated by the spring 15 may be reinforced by a slow slope made with increasing the thickness of the fixed end 16a. However, an extra thick latch formed in entire area of the fixed end side results in that only the back side is easily bent, so that it is necessary to control the thickness within the proper values.

In the engaging condition between the optical connector plug 10 having the pair of latches and the adapter, unless simultaneously pressing both pressing elements 16b, the optical connector plug 10 is not disconnected. In other words, it has a function to prevent the accidental disconnection.

Second Embodiment

Figure 6:
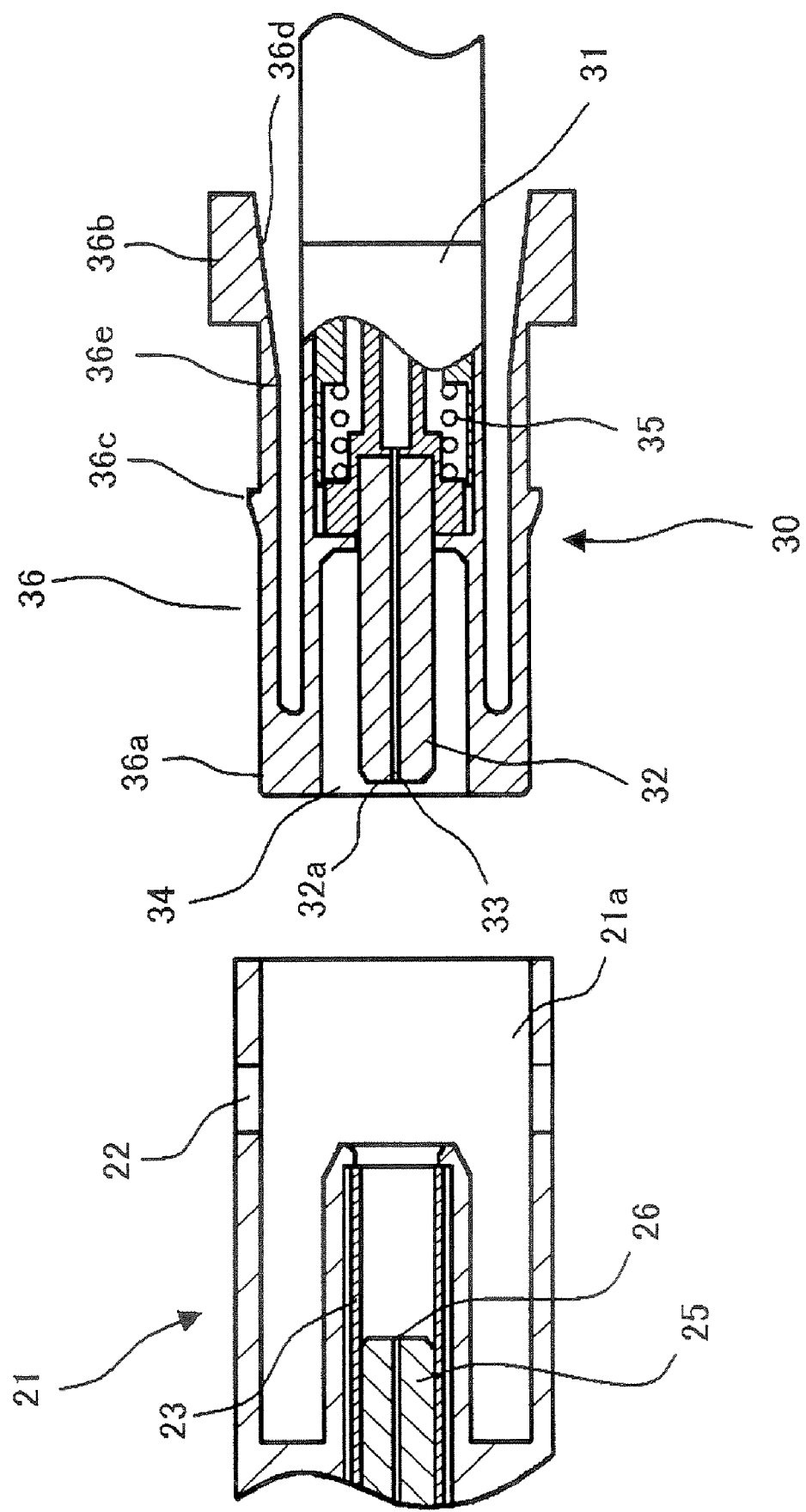
FIG. 6 is a cross sectional view of the relevant part of the further embodiment.

In FIG. 6 and FIG. 7, an optical connector includes an optical connector plug and a receptacle 21 with a ferrule 25 accommodated therein, capable to be connected to the optical connector plug.

The shape of the optical connector plug 30 including a latch 36 structure is the same as that of the first embodiment.

The receptacle 21, similar to the adapter in the first embodiment, has an engaging hole 22 capable to be connected with an engaging projection 36c that is provided in the latch 36 of the optical connector plug 30.

In FIG. 6, the optical connector plug 30 and the receptacle 21 respectively accommodate therein ferrules 33, 26 which hold a single core optical fiber. Also, a split sleeve 23 is installed in the receptacle 21 for highly accurately aligning respective ferrules to be connected.

Springs for pressing the ferrules may be provided in both of the optical connector plug and the receptacle, however the spring may be provided in one of the optical connector and the receptacle, in which case any problem is not caused.

In the first embodiment and the second embodiment mentioned above, there are explained the latch connecting structures that are the interfacing elements of the optical connector, but various modified embodiments can be made within the scope of the claims.

In the above-mentioned embodiments, the optical connectors for the single core optical fiber are explained, but this latch connecting mechanism is not limited to the single core optical connector, and it is applicable for the multi core MT connector (Mechanically Transferable Connector, JIS C 5981) and the multi string optical connector using the single core ferrule.

In addition, regarding the optical connector of the invention, it can be expected that the optical connector is assembled and installed outdoors.

For example, the ferrule accommodated in the optical connector plug (or receptacle) has no optical fiber fixed therein, so that an optical connector may have the structure in which the glass optical fiber is taken out from the cable to be wired outdoor, the end surface thereof is cut, and inserted into near the end surface of the ferrule, and then adhesively fixed. In this regard, the housing member of the optical connector is required to have the structure into which an adhesive can be injected.

Moreover in the case of the single core optical fiber, the ferrule accommodated in the optical connector plug (or receptacle) may have an optical connector ferrule with mechanical splice mechanism for assemble on construction site, that is, a capillary member made of ceramics for connecting with a corresponding ferrule, and a mechanical splice member to be coupled to the capillary member. In this regard, the optical fiber with its end surface cut on the construction site is fixedly connected with the optical fiber being pre-installed and fixed in the capillary in the mechanical splice member, thus the connector is formed.

According to the present invention, the optical connector is comprised of two optical connector plugs and an adapter, or optical connector plugs and a receptacle. The optical connector plug has a pair of latches at its opposing surface, in order to downsize the structure, and a clearance between the optical connector plug and the adapter (or receptacle) is minimized. A latch thickness of the optical connector plug is minimized as much as forming possible thickness, and the slope is provided in the lower surface of the latch. On the other hand, even when the clearance between the optical connector plug and the adapter as well as the clearance between the latch and the side of the plug housing are very small, the sufficient elastic deformation in the latch can be obtained to release the engaging projection from the engaging hole of the adapter by pressing the back side of the latch, so that the connecting and disconnecting operation can be surely performed. Therefore, the optical connector suitable for high density package can be provided.

The present invention is not limited to the above described embodiments, and various variations and modifications may be possible without departing from the scope of the present invention.

This application is based on the Japanese Patent application No. 2005-312342 filed on Oct. 27, 2005, entire content of which is expressly incorporated by reference herein.

What is claimed is:

1. A optical connector comprising:
    an optical fiber;
    a ferrule for holding said optical fiber in such manner that a terminal end surface of said optical fiber is exposed;
    an optical connector plug having a plug housing for accommodating said ferrule and said optical fiber, said plug housing having a uniform cross section across a main body portion thereof;
    an adapter having an opening portion to/from which said optical connector plug is attachable/detachable;
    an engaging hole arranged at a predetermined location of said adapter; and
    a cantilever type latch provided on at least one side surface of said plug housing, said latch having a fixed end fixed to said plug housing at said opening portion side to which the terminal end surface of the optical fiber is exposed, and an operable terminal end which is operated to elastic-deformably press to a direction which is perpendicular to an optic axis of the optical fiber at an opposite side of the fixed end,
    wherein each of said latch is configured such that an upper surface thereof is parallel with a side of said plug housing,
    an engaging projection is provided near a center of said upper side of the latch, so as to be engaged in said engaging hole formed in said adapter,
    said engaging projection has a slope that declines toward the fixed end of said latch,
    a clearance which is nearly equal to or greater than a height of said engaging projection is provided, between a lower surface of said latch which comprises a back side of said engaging projection and the side surface of the plug housing,
    another slope is formed by a lower surface of the latch, such that a clearance from the side surface of said plug housing increases from a vicinity of the engaging projection to the operable terminal end, and
    a gradient of said slope of the latch is formed so as to be nearly equal to or greater than a rotation angle required for elastic deformation of the latch in which the fixed end of the latch functions as a fulcrum.

2. The optical connector according to claim 1, wherein the latch is formed respectively on the side surfaces of said plug housing which side surfaces are opposing each other, and the engaging hole is formed respectively in corresponding to the engaging projections on the side surfaces of the adaptor.

3. The optical connector according to claim 1 or claim 2, wherein when a part of the lower surface of the latch contacts with the side surface of the plug housing by the elastic deformation of the latch, a height of a top of the engaging projection is nearly equal to or lower than a height of the fixed end of the latch.

4. The optical connector according to claim 3, wherein said another slope formed in the lower surface of the latch has a slope starting point at an area between a position below the engaging projection and the operable terminal end,
    the lower surface of the latch has a gradient which is parallel to the side surface of the plug housing or slower than an area of the operable terminal end within an area from the slope starting point to the fixed end, and
    the elastic deformation of the latch generated by pressing enables the slope starting position to contact the side surface of said plug housing.

5. The optical connector according to claim 3, wherein the side surface of said plug housing opposing to the lower surface of the latch includes a inclined surface with respect to an optical axis of the optical fiber, and
    when the elastic deformation of the latch lets the part of the latch lower surface contact the side of said plug housing, no matter where a contact position is, a height of a top of the engaging projection is equal to or lower than a height of the fixed end of the latch.

6. The optical connector according to claim 4, wherein the slope starting point formed at the lower surface of the latch is located in a central area from a location below the engaging projection to the terminal end.

7. An optical connector as claimed in claim 1, wherein the latch has a length dimension greater than that of said plug housing.

8. The optical connector as claimed in claim 1, wherein said fixed end of said latch is fixed at an end portion of said plug housing.

9. An optical connector as claimed in claim 1, wherein said latch has a reduced thickness portion located between said engaging portion and said operable terminal end of said latch.

* * * * *